United States Patent [19]

Hosaka et al.

[11] 4,171,984
[45] Oct. 23, 1979

[54] REFRACTORY COMPOSITION FOR FLOW CASTING

[75] Inventors: Takuo Hosaka; Kunihiko Shiraishi, both of Toyota; Ziro Nakano, Settsu; Masanori Kinugasa, Tatsuno, all of Japan

[73] Assignees: Nippon Crucible Co., Ltd., Tokyo; Teikoku Kako Co., Ltd., Osaka, both of Japan

[21] Appl. No.: 894,276

[22] Filed: Apr. 7, 1978

[30] Foreign Application Priority Data

Apr. 9, 1977 [JP] Japan .................................. 52/40699

[51] Int. Cl.² ............................................. B28B 7/34
[52] U.S. Cl. .............................. 106/38.3; 106/38.35; 106/38.9; 106/82; 106/84
[58] Field of Search ................... 106/38.3, 38.35, 38.7, 106/39.7, 44, 38.9, 82, 84

[56] References Cited

U.S. PATENT DOCUMENTS

| | | | |
|---|---|---|---|
| 3,801,704 | 4/1974 | Kobayashi et al. | 423/309 |
| 3,832,191 | 8/1974 | Bolding et al. | 106/38.3 |
| 4,037,015 | 7/1977 | Koike et al. | 106/38.3 |
| 4,080,213 | 3/1978 | Mori et al. | 106/38.35 |

*Primary Examiner*—Lorenzo B. Hayes
*Assistant Examiner*—W. Thompson
*Attorney, Agent, or Firm*—Sughrue, Rothwell, Mion, Zinn and Macpeak

[57] ABSTRACT

A refractory composition for flow casting, comprising (1) 100 parts by weight of a refractory material and (2) about 1.15 to 9.4 parts by weight of a binder consisting of an alkali metal silicate, sparingly water-soluble aluminum tripolyphosphate and at least one of an organic paste and a clay, the refractory composition being capable of being kneaded with water prior to use.

13 Claims, No Drawings

REFRACTORY COMPOSITION FOR FLOW CASTING

BACKGROUND OF THE INVENTION

1. Field of the Invention

This invention relates to a refractory composition for flow casting.

2. Description of the Prior Art

In recent years, there has been an increasing demand for monolithic refractories which are employed in the construction and repair of furnaces using methods such as flow casting, spraying or ramming. The flow casting method, simply called pouring, has gained increased importance because the method is very simple, and can be used for parts having complicated shapes and for those parts which cannot be constructed or repaired by spraying or ramming.

Refractories for flow casting should have sufficient flowability during the period required for casting, a hardenability which will produce sufficient strength to permit a rapid removal of the mold after casting (that is, shape retention at room temperature), and sufficient heat resistance at furnace temperatures. Such refractories must also have specified characteristics depending on the purpose of use.

Refractories of this kind have been called castable refractories, and those containing alumina cements, which in general having a composition comprising about 51 to 64% by weight $Al_2O_3$, about 18 to 38% by weight CaO, about 6 to 8% by weight $SiO_2$ and about 1 to 5% by weight $Fe_2O_3$, as a binder have been widely used. Due to the use of alumina cement, these refractories have the following defects.

The strength achieved in alumina cement at room temperature is due to a hydration reaction, and the resulting hydration product contains about 10 molecules of water of crystallization (bonded water) per molecule of alumina cement.

Water added to castable refractories comprising alumina cement as a binder for achieving the flowability required for casting is partly consumed in the hydration reaction of the alumina cement and changes to water of crystallization in the hydrated compound to produce strength at room temperature. The excess water evaporates on drying after casting. The water remaining as water of crystallization in the hydrated compound escapes only very gradually even when heated to higher than 100° C. Hence, when the temperature of the refractory after drying is increased to the furnace use temperature, the molded refractory sometimes explodes and is destroyed if a mistake in controlling the rate of temperature increase is made. Furthermore, since the strength of the hydrated compound decreases on dehydration of the hydrated compound, there is a temperature range within which a marked decrease in strength occurs before the temperature reaches about 1,000° C. at which the sintering of the alumina cement due to heat reaction begins.

Alumina cement contains CaO and $Al_2O_3$ as main components and the CaO content of the alumina cement can be as high as 18 to 38% by weight although this will differ depending on the type of alumina cement. Accordingly, even if the aggregate in the refractory containing an alumina cement as a binder is a high refractory material, since the binder portion of the refractory contains a large amount of CaO, marked chemical corrosion of the refractory material occurs when it comes into contact with molten metal or slag.

Use of phosphoric acid as a binder instead of the alumina cement, where after casting, the refractory is aged at 350° C. to induce a reaction with the alumina aggregate is also known. However, this approach has the defect that because of the use of phosphoric acid, danger may be involved in its handling or in using the refractory.

SUMMARY OF THE INVENTION

An object of this invention to provide a refractory composition for flow casting which does not contain alumina cement, and which does not have the above-described defects.

According to this invention, there is provided a refractory composition for flow casting, which comprises (1) 100 parts by weight of a refractory material and (2) about 1.15 to 9.4 parts by weight of a binder consisting of an alkali metal silicate, sparingly water-soluble aluminum tripolyphosphate and at least one of an organic paste and a clay, with the amount of the alkali metal silicate being calculated on a solids basis when it is liquid, and with the refractory composition being capable of being kneaded by adding water thereto before use.

DETAILED DESCRIPTION OF THE INVENTION

By using the alkali metal silicate and the sparingly water-soluble aluminum tripolyphosphate as binder components, the slow action of the aluminum tripolyphosphate maintains the refractory composition flowable for the period of time required for casting (to be referred to hereinafter as "pot life") after kneading the refractory composition by adding water. After this period has passed, the aqueous sol of the alkali metal silicate can be hardened, and the mold can be removed. In other words, the refractory composition has sufficient hardenability that shape retention is achieved. In the subsequent drying step, strength of the refractory composition is developed at room temperature due the cohesive force of the fine particles of the aqueous sol. On increase in the temperature, the alkali metal silicate and the aluminum tripolyphosphate are sintered to produce a strength sufficient to withstand actual use conditions for the refractory composition. The addition of the organic paste, clay or both serves to prevent a separation of the coarse particles of the refractory material during the time when the refractory composition is kneaded in a flowable state by addition of water and cast, and to allow the molded product to retain a uniform structure.

The various materials which form the refractory composition of this invention are described in greater detail below.

Any refractory materials can be used in this invention other than basic refractory materials composed mainly of MgO, CaO, etc. which will react with the aqueous sol of the alkali metal silicate as one component of the binder used in this invention to cause a loss of the characteristics of the aqueous sol. Suitable specific refractory materials which can be used in this invention include oxides (i.e., acid oxides or neutral oxides). More specifically suitable acid oxide refractory materials which can be used include quartz, silica, etc. and suitable neutral oxide refractory materials which can be used include fused alumina, calcined alumina, sintered alumina, mullite (including synthetic mullite), etc., suitable carbides which can be used include silicon carbide and suitable nitrides which can be used include silicon nitride. Further and more specifically synthetic mullite can be used as a refractory material. In general, the chemical composition of synthetic mullite is 21.69% by weight $SiO_2$ and 76.88% by weight $Al_2O_3$ and synthetic mullite has an apparent specific gravity of 2.91 and includes as mineral components 10.36% by weight corundum and 89.64% by weight mullite. Sintered alumina, in general contains 99.49% by weight $Al_2O_3$ and 0.06% by weight of $SiO_2$ and has an apparent specific gravity of 3.73. Calcined alumina, in general, contains 89% by weight $Al_2O_3$, 6% by weight $SiO_2$, 3.3% by weight $TiO_2$ and 1.2% by weight $Fe_2O_3$ with an apparent specific gravity of 3.38 to 3.50. Silicon carbide, in general, contains 85 to 98% by weight of α-SiC and has a true specific gravity of 3.25.

The refractory material should be appropriately chosen depending on the shape, size and thickness of the container, trough, furnace wall, etc. to which the refractory material is to be applied, and the intended service conditions, namely the temperature and the gas, molten metal, molten slag, etc. with which such will come into contact. The particle size of the refractory material should be adjusted accordingly. While the particle size is not specifically limited, a suitable particle size is about 4 mm or smaller.

Examples of suitable alkali metal silicates which can be used as a binder component are commercially available powdery sodium silicate and powdery potassium silicate, and liquid sodium silicate, potassium silicate and lithium silicate. These alkali metal silicates are described in greater detail below. The powdery sodium silicate in general has a particle size of 0.2 mm or more 2 wt.%; more than 0.125 mm to less than 0.2 mm 36 wt.%; and 0.125 mm or less 62 wt.% and a $SiO_2/Na_2O$ molar ratio of about 3.15 to 3.35, liquid sodium silicate has a liquid specific gravity of about 1.4, a solids content of about 37 to 40% by weight and a $SiO_2/Na_2O$ molar ratio of about 3.1 to 3.3, liquid lithium silicate has a liquid specific gravity of about 1.17 to 1.21, a solids content of about 21 to 23% by weight and $SiO_2/Li_2O$ molar ratio of about 3.5 to 7.5 and liquid potassium silicate has a liquid specific gravity of about 1.26 to 1.41 a solids content of about 28 to 40% by weight and a $SiO_2/K_2O$ molar ratio of about 3.0 to 3.5.

When a liquid alkali metal silicate is used, the amount used is determined on the basis of the solids content of the liquid. The powdery sodium silicate or powdery potassium silicate is mixed with the refractrory material together with the other components of the binder. When water is added before casting and the refractory composition is kneaded, the silicate dissolves in the water to form an aqueous sol of the alkali metal silicate. The amount of water added should be at least about 5 times by weight to the weight of the alkali metal silicate (on a solids basis) to achieve flowability. The pot life required for use will, of course, vary depending on the conditions of use. When a longer pot life is required, the surface of the powdery alkali metal silicate can be treated with at least one of a higher fatty acid, e.g., oleic acid, linolic acid, stearic acid, palmitic acid, etc., a paraffin, e.g., solid paraffin, liquid paraffin, etc., and an oil and a fat, e.g., soy bean oil, linseed oil, tung oil, beaf tallow, lard, etc. so as to control the rate of dissolution of the alkali metal silicate in water. This surface treatment, e.g., by adding 1 to 10 parts by weight of a higher fatty acid to 100 parts by weight of the alkali metal silicate particles and mixing such, with heating if necessary to achieve fluidity, to coat the surface of the particles, produces a temporary water-repellent effect, and the rate of dissolution can be controlled thereby. The term "alkali metal silicate" as used herein is intended to include untreated alkali metal silicates and those which have been so treated.

The amount of the alkali metal silicate is 0.4 part by weight to 2.2 parts by weight per 100 parts by weight of the refractory material. If the amount is less than 0.4 part by weight, the strength of the refractory material after curing, that is the shape retention (hardenability) on removal of the mold, is insufficient. If the amount exceeds 2.2 parts by weight, the heat resistance of the refractory composition at high temperatures is undesirably reduced.

The sparingly water-soluble aluminum tripolyphosphate may, for example, be produced by the method disclosed in Japanese patent application (OPI) No. 128,698/76. The refractory composition for flow casting, described above, should have sufficient flowability during the time required for casting. The refractory composition must have a sufficient pot life for pouring operation, and harden as rapidly as possible after the pouring operation to produce sufficient strength that the mold can be removed. Sufficient pot life and then rapid hardening to a strength higher than a certain value with the refractory composition can only be achieved by utilizing the sparing solubility in water, very high acidity and weak acid strength of the aluminum tripolyphosphate present as a component therein.

Simply an inorganic acid may be used if it is merely necessary to harden a liquid sodium silicate diluted with at least 5 times its weight (on a solids basis) of water. In this case, the reaction is extremely instantaneous, and the refractory composition does not have any pot life. In an attempt to harden a liquid sodium silicate which has an appreciable pot life, the use of calcium silicofluoride, amorphous aluminum phosphate, type B and type A condensed aluminum phosphate, silicon phosphate, titanium phosphate, boron phosphate, etc. has been suggested. When these compounds were tried on the diluted alkali metal silicate such as liquid sodium silicate in this invention, the pot life was too short or the hardening was not sufficient. Satisfactory results were thus obtained both in terms of pot life and hardenability.

The aluminum tripolyphosphate used in this invention can be represented by the chemical formula $H_2AlP_3O_{10}\cdot 2H_2O$. It is only sparingly soluble in water and has very high acidity but a weak acid strength, e.g., as disclosed in U.S. Pat. No. 3,801,704. This property is of utmost importance in accomplishing the present invention. Extensive investigations have been made on hardening alkali metal silicates such as liquid sodium silicate with aluminum tripolyphosphate over many years, and it has now been found aluminum tripolyphosphate provides a long pot life and superior hardenability in a system in which an alkali metal silicate is diluted with at least 5 times its weight (on a solids basis) of water. While not desiring to be bound, it is believed that the long pot life arises to a great extent because aluminum tripolyphosphate exhibits an acidity which is several tens of magnitude larger than that of titanium phosphate, B-type condensed aluminum phosphate, and the acidity is of a weak acid type.

Aluminum tripolyphosphate, when heated to about 450° C. or higher, undergoes the following condensation reaction.

$$H_2AlP_3O_{10} \cdot 2H_2O \rightarrow Al(PO_3)_3 + 3H_2O$$

The condensed aluminum phosphate formed by heating is A-type, B-type and D-type. The property of aluminum tripolyphosphate to condense further at about 450° C. or above is believed to mean that aluminum tripolyphosphate becomes active at about 450° C. or above and strengthens the bonding of the refractory material. As will be shown in the Examples given hereinafter, this greatly contributes to the generation of strength at 800° C.

The amount of the aluminum tripolyphosphate used is 0.25 to 2.2 parts by weight per 100 parts by weight of the refractory material. If the amount is less than 0.25 part by weight, a very long period of time is required to harden the aqueous sol of the alkali metal silicate, or the strength required for shape retention cannot be produced. If the amount exceeds 2.2 parts by weight, no additional strength on hardening is achieved. A suitable particle size for the aluminum tripolyphosphate can be about 40 μm or less.

Clay is widely used as a binder for refractories. In the present invention, the clay is added to prevent a separation of the coarse particles of the refractory material when water is added to the powdery mixture and the mixture is kneaded. Preferably, the clay used in this invention is kaolin. The amount of the clay used is 0.5 to 5 parts by weight per 100 parts by weight of the refractory material. If the amount of the clay is less than 0.5 part by weight, no appreciable effect due to the clay is seen. If the amount exceeds 5 parts by weight, the amount of water required to render the refractory composition flowable must be increased, and the drying of the refractory composition after casting is time-consuming. Furthermore, shrinkage on calcination at the time of heating increases and cracks occur. A suitable particle size for the clay is about 1 to 0.01 μm.

Commercially available carboxymethyl cellulose can, for example, be used as the organic paste (organic binder). The amount of the organic paste used is about one-fifth the amount of the clay. High molecular weight polysaccharide gums can also be used.

A suitable amount of the clay and the organic paste when such is used together can range from 0.5 to 5 parts by weight per 100 parts by weight of the refractory material.

The refractory composition for flow casting is produced by mixing a refractory material with the powdery alkali metal silicate, sparingly water-soluble aluminum tripolyphosphate and the organic paste and/or clay. Immediately before application, water is added to the mixture and the mixture is kneaded. The amount of water added is adjusted so as to obtain the flowability required for the particular application involved. The amount of water, however, should be at least 5 times the weight of the alkali metal silicate (on a solids basis) present. If the mixture becomes too flowable, a decrease in strength or a separation of the particles is likely to occur. When a liquid alkali metal silicate is used, it may be added together with water immediately before application. In this case, the amount of the alkali metal silicate is determined on the basis of the solids content thereof, as stated hereinabove.

The following Examples are given to illustrate the present invention in greater detail. Unless otherwise indicated herein, all parts, percents, ratios and the like are by weight.

EXAMPLE 1

Alumina Type

In accordance with the formulations shown in Table 1 below, refractory compositions of this invention and a conventional castable refractory material comprising alumina cement (Comparison A) were compared.

Table 1

| Component | Invention (parts by weight) | | | | Comparison A (parts by weight) (Conventional refractory) |
|---|---|---|---|---|---|
| | No. 1 | No. 2 | No. 3 | No. 4 | |
| Sintered Alumina (4-1 mm)* | 40 | 40 | 40 | 40 | 50 |
| Sintered Alumina (less than 1 mm) | 20 | 20 | 20 | 20 | 25 |
| Sintered Alumina (less than 150 μ) | 35 | 35 | 35 | 35 | 20 |
| Calcined Alumina (less than 44 μ) | 5 | 5 | 5 | 5 | 5 |
| Total of the Refractory Material | 100 | 100 | 100 | 100 | 100 |
| Aluminum Tripolyphosphate (7.2 μm) | 0.3 | 0.6 | 1.0 | 0.6 | — |
| Powdery Sodium Silicate (average 7.2 μm 0% 44 μm or larger) | 1.5 | 1.0 | — | — | — |
| Liquid Lithium Silicate (SiO$_2$/LiO$_2$:3.5) | — | — | — | 1.0** | — |
| Clay ("Kibushi" clay) (about 1 μm or less) | 1.5 | 1.5 | 1.5 | 0.8 | — |
| CMC*** | — | — | — | 0.2 | — |
| Alumina Cement**** | — | — | — | — | 15 |
| Water | 9 | 9 | 9 | 8 | 11 |

*Particle size
**Calculated on a solids basis
***Carboxymethyl cellulose
****Alumina Cement Composition (% by weight) Al$_2$O$_3$ 54.5% CaO 38% SiO$_2$ 6% Fe$_2$O$_3$ 1.5%

The powdery materials were well mixed, and then water was added thereto. The mixture was kneaded, and cast into a mold having an inside size of 40×40×160 mm to form a sample. The sample was aged at 20°±3° C. and a humidity of 80 to 85% for 24 hours, and the mold was removed. The product was dried in a dryer at 105° to 110° C., and then calcined at 800° C. and 1,450° C. Linear shrinkage and modulus of rupture were measured on the products dried at 110° C., the products calcined at 800° C. and the products calcined at 1,450° C. Hot modulus of rupture at 1,450° C. was measured on some of the products dried at 110° C.

The corrosion resistance was determined as follows: Samples having a trapezoidal cross-section were prepared by the same method as described above, and calcined at 350° C. Each of the resulting samples was bonded to the inside surface of a cylindrical furnace having an inclined rotary shaft, and while rotating the furnace body, an oxygen-propane flame was blown into the furnace to melt blast furnace pig iron and blast furnace slag at 1,550° C. The molten iron and slag were maintained for a predetermined period of time in contact with the sample, and the degree of corrosion of each sample was compared with that of a conventional refractory (Comparison A).

Spalling resistance was determined by placing a sample having a size of 40×40×160 mm prepared as described above and calcined at 1,200° C. into a furnace at 1,200° C., heating the sample for 1 hour and then cooling the sample in the air outside the furnace. This cycle was repeated three times, and the degree of cracking was observed.

The results of these tests are shown in Table 2 below.

As can be seen from the results in Table 2 above, the products in accordance with this invention were not different from the conventional refractory in flow castability represented by the kneading condition with water, castability into molds and hardenability after 24 hours, and exhibited sufficient shape retention after mold removal. In regard to the linear change rate, the conventional refractory calcined at 1,450° C. exhibited a shrinkage of 0.5%, whereas the products of this invention calcined at 1450° C. showed a shrinkage of as small as 0.2%. The products of the invention dried at 110° C. had a somewhat lower flexural strength than the conventional product. However, the conventional product calcined at 800° C. showed a marked decrease in modulus of rupture, whereas the products of the invention did not show such a tendency. On the contrary, with increasing calcination temperatures, the products of the invention showed a higher modulus of rupture. In particular, the hot modulus of rupture of the products of this invention at 1,450° C. were higher than that of the conventional product. It is particularly noteworthy that the amount of corrosion in the products of this invention was as small as 55 to 60% based on the conventional product, showing superior corrosion resistance. With regard to spalling resistance, the conventional product broke after three cycles, whereas cracks generated in the products of this invention were very fine, and did not affect their actual use.

EXAMPLE 2

Mullite-Silicon Carbide Type

In accordance with the formulations shown in Table 3 below, the product of the invention was compared Table 2

| Evaluation | Invention | | | | Comparison A (conventional refractory) |
|---|---|---|---|---|---|
| | No. 1 | No. 2 | No. 3 | No. 4 | |
| Kneading Condition with Water | Good | Good | Good | Good | Good |
| Castability into Mold | Good | Good | Good | Good | Good |
| Hardenability After 24 Hours | Good | Good | Good | Good | Good |
| Linear Change Rate (%, of product dried at 110° C.) | −0.1 | −0.1 | −0.1 | −0.1 | below −0.1 |
| Linear Change Rate (%, of product calcined at 800° C.) | −0.15 | −0.15 | −0.15 | −0.15 | −0.1 |
| Linear Change Rate (%, of product calcined at 1450° C.) | −0.2 | −0.2 | −0.2 | −0.2 | −0.5 |
| Modulus of rupture Kg/cm$^2$ | | | | | |
| Of product dried at 110° C. | 25 | 18 | 21 | 24 | 40 |
| Of product calcined at 800° C. | 30 | 32 | 38 | 35 | 25 |
| Of product calcined at 1450° C. | 42 | 50 | 78 | 47 | 62 |
| Hot modulus of rupture at 1450° C. (kg/cm$^2$) | 12 | 15 | 9 | 10 | 7 |
| Corrosion Resistance (*) | 55 | 55 | 60 | 60 | 100 |
| Spalling Resistance (three cycles of heating at 1200° C. and air cooling) | Fine cracks occured | " | " | " | Broken |

(*)Percentage of the volume corroded when the corroded volume of the conventional refractory was taken to be 100.

with a conventional castable refractory comprising alumina cement (Comparison B).

Table 3

| Component | Invention No. 5 (parts by weight) | Comparison B (parts by weight) |
|---|---|---|
| Synthetic Mullite (4-1 mm) | 40 | 40 |
| Synthetic Mullite (less than 1 mm) | 10 | 10 |
| Silicon Carbide (less than 1 mm) | 10 | 10 |
| Silicon Carbide (less than 150 μ) | 35 | 35 |
| Calcined Alumina (less than 44 μ) | 5 | 5 |
| Total of Refractory materials | 100 | 100 |
| Aluminum Tripolyphosphate (7.2 μm) | 0.6 | — |
| Powdery Sodium Silicate (average 7.2 μm; 0% 44 μm or larger) | 1.0 | — |
| Clay ("Kibushi" clay) (about 1 μm or less) | 1.5 | — |
| Alumina Cement (Same as in Ex. 1) | — | 15 |
| Water | 8.5 | 10.7 |

Test samples were prepared in the same manner as in Example 1, and tested in the same manner as in Example 1. The results obtained are shown in Table 4 below.

Table 4

| Evaluation | Invention No. 5 | Comparison B |
|---|---|---|
| Kneading Condition with Water | Good | Good |
| Castability into Mold | Good | Good |
| Hardenability After 24 Hours | Good | Good |
| Linear Change Rate, % | | |
| Of product dried at 110° C. | −0.1 | Below −0.1 |
| Of product calcined at 800° C. | −0.2 | −0.2 |
| Of product calcined at 1450° C. | −0.3 | −0.4 |
| Modulus of rupture (kg/cm$^2$) | | |
| Of product dried at 110° C. | 25 | 42 |
| Of product calcined at 800° C. | 40 | 23 |
| Of product calcined at 1450° C. | 81 | 65 |
| Hot modulus of rupture at 1450° C. (kg/cm$^2$) | 14 | 6 |
| Corrosion Resistance (*) | 40 | 100 |
| Spalling Resistance (three cycles of heating at 1200° C. and air cooling) | Fine cracks occurred | Broken |

(*)Percentage of the volume corroded when the corroded volume of the conventional refractory was taken to be 100.

Just as in Example 1, the product of the invention (No. 5) was not different in flow castability from the product of Comparison B. The product of the invention calcined at 800° C. and 1450° C. had a high modulus of rupture, and a high hot modulus of rupture at 1,450° C. at which temperature the product is actually used. The product of the invention further has a very high corrosion resistance, as shown by the amount of corrosion which was less than half of that in the conventional product. With respect to spalling resistance, the cracks formed in the product of this invention were very fine.

The above results demonstrate that the refractory composition of this invention has the same castability and hardenability as conventional castable refractories comprising an alumina cement as a binder, and exhibits superior characteristics at a temperature of 800° C. or above to conventional castable refractories, thus exhibiting its great utility at those parts which come into contact with molten metal or slag, or at those parts which are subject to temperature change during use.

While the invention has been described in detail and with reference to specific embodiments thereof, it will be apparent to one skilled in the art that various changes and modifications can be made therein without departing from the spirit and scope thereof.

What is claimed is:

1. A refractory composition for flow casting, which consists essentially of
   (1) 100 parts by weight of a refractory material, and
   (2) about 1.15 to 9.4 parts by weight of a binder consisting of an alkali metal silicate, substantially water-insoluble aluminum tripolyphosphate which undergoes a hardening reaction with said alkali metal silicate to strengthen bonding of said refractory material and at least one member selected from the group consisting of an organic paste selected from the group consisting of carboxymethyl cellulose or polysaccharide gum, a clay and a mixture thereof which prevents separation of coarse particles of refractory material when the composition is kneaded by adding water before use, the refractory composition being capable of being kneaded by adding water before use.

2. The refractory composition of claim 1, wherein the alkali metal silicate is sodium silicate, potassium silicate or lithium silicate.

3. The refractory composition of claim 1, wherein the surface of the alkali metal silicate has been treated with at least one of a higher fatty acid, a paraffin, an oil and a fat.

4. The refractory composition of claims 1, 2 or 3, wherein the amount of the alkali metal silicate on a solids basis is 0.4 to 2.2 parts by weight.

5. The refractory composition of claim 1, wherein the amount of the aluminum tripolyphosphate is 0.25 to 2.2 parts by weight.

6. The refractory composition of claim 1, wherein the amount of the clay is 0.5 to 5 parts by weight, the amount of the organic paste is about 0.1 to 1 parts by weight, and the amount of the clay and the organic paste when used together is about 0.5 to 5 parts by weight.

7. The refractory composition of claim 1, wherein the amount of the alkali metal silicate on a solids basis is 0.4 to 2.2 parts by weight, the amount of the clay is 0.5 to 5 parts by weight, the amount of the organic paste is about 0.1 to 1 part by weight, and the amount of the clay and the organic paste when used together is about 0.5 to 5 parts by weight and the amount of the aluminum tripolyphosphate is 0.25 to 2.2 parts by weight, all per 100 parts by weight of the refractory material.

8. The refractory composition of claim 7, wherein said refractory material is a non-basic refractory material.

9. The refractory composition of claim 7, wherein said refractory material is selected from the group consisting of an acid oxide refractory material, a neutral oxide refractory material, a carbide refractory material and a nitride refractory material.

10. The refractory composition of claim 9, wherein said refractory material is selected from the group consisting of quartz, silica, fused alumina, calcined alumina, sintered alumina, mullite, silicon carbide, and silicon nitride.

11. The refractory composition of claim 9, further comprising water in an amount of at least about 5 times by weight the weight of the alkali metal silicate (on a solids basis).

12. The refractory composition of claim 9, wherein said aluminum tripolyphosphate has the chemical formula $H_2AlP_3O_{10} \cdot 2H_2O$.

13. The refractory composition of claim 12, wherein said clay is kaolin.

* * * * *